US012056609B2

United States Patent
Yoo et al.

(10) Patent No.: US 12,056,609 B2
(45) Date of Patent: Aug. 6, 2024

(54) GRADIENT FEEDBACK FRAMEWORK FOR JOINT TRANSCEIVER NEURAL NETWORK TRAINING

(71) Applicant: QUALCOMM Incorporated, San Diego, CA (US)

(72) Inventors: Taesang Yoo, San Diego, CA (US); June Namgoong, San Diego, CA (US); Naga Bhushan, San Diego, CA (US); Tingfang Ji, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 989 days.

(21) Appl. No.: 16/918,782

(22) Filed: Jul. 1, 2020

(65) Prior Publication Data

US 2021/0264255 A1 Aug. 26, 2021

Related U.S. Application Data

(60) Provisional application No. 62/980,941, filed on Feb. 24, 2020.

(51) Int. Cl.
*G06N 3/08* (2023.01)
*G06N 3/04* (2023.01)
(Continued)

(52) U.S. Cl.
CPC ............... *G06N 3/08* (2013.01); *G06N 3/04* (2013.01); *H04B 1/02* (2013.01); *H04B 1/06* (2013.01);
(Continued)

(58) Field of Classification Search
CPC . H04L 1/0026; H04L 5/0007; H04L 25/0224; H04L 25/0254; H04B 1/02;
(Continued)

(56) References Cited

U.S. PATENT DOCUMENTS 10,432,370 B2    10/2019 Luo et al.
10,880,062 B2    12/2020 Ly et al.
(Continued)

FOREIGN PATENT DOCUMENTS

WO    2014110515    7/2014
WO    2019005311    1/2019

OTHER PUBLICATIONS

Goutay M., et al., "Deep Reinforcement Learning Auto Encoder with Noisy Feedback", Arxiv.Org, Cornell University Library, 201 Olin Library Cornell University Ithaca, NY14853, Oct. 12, 2018 (Oct. 12, 2018), XP081064891, 6 Pages, Section II Section IV.
(Continued)

*Primary Examiner* — Tuan H Nguyen
(74) *Attorney, Agent, or Firm* — QUALCOMM Incorporated

(57) ABSTRACT

A method of wireless communication performed by a receiving device includes determining a transmission reference point value and determining a transmission reference point gradient of a loss based on the transmission reference point value. The receiving device also transmits a message comprising the transmission reference point gradient to a transmitting device. A method of wireless communication by a transmitting device includes receiving a transmission reference point gradient of a loss from a receiving device. The transmitting device determines a transmission point-payload gradient of a transmission reference point value with respect to an encoded value generated by a transmitter neural network. The transmitting device also determines a payload
(Continued)

gradient of the loss based on a product of the transmission reference point gradient and the transmission point-payload gradient. The transmitting device further updates weights of the transmitter neural network based on the payload gradient.

22 Claims, 11 Drawing Sheets

(51) Int. Cl.
*H04B 1/02* (2006.01)
*H04B 1/06* (2006.01)
*H04B 17/20* (2015.01)
*H04L 1/00* (2006.01)
*H04L 25/02* (2006.01)
*H04L 5/00* (2006.01)

(52) U.S. Cl.
CPC ........... *H04B 17/20* (2015.01); *H04L 1/0026* (2013.01); *H04L 25/0224* (2013.01); *H04L 25/0254* (2013.01); *H04L 5/0007* (2013.01)

(58) Field of Classification Search
CPC . H04B 1/06; H04B 17/20; G06N 3/04; G06N 3/08
See application file for complete search history.

(56) References Cited

U.S. PATENT DOCUMENTS

2019/0150179 A1    5/2019  Soriaga et al.
2019/0287022 A1*   9/2019  Zhang .................... G06F 17/16

OTHER PUBLICATIONS

International Search Report and Written Opinion—PCT/US2021/012491—ISA/EPO—Apr. 9, 2021.
O'Shea T., et al., "An Introduction to Machine Learning Communications Systems", Arxiv.Org, Cornell University Library, 201 Olin Library Cornell University Ithaca, NY 14853, Feb. 2, 2017 (Feb. 2, 2017), XP080746465, pp. 1-10, Section I.C Section II Section III.E.
Sahai A., et al., "Learning to Communicate in a Noisy Environment", Arxiv.Org, Cornell University Library, 201 Olin Library Cornell University Ithaca, NY 14853, Oct. 21, 2019 (Oct. 21, 2019), XP081518723, Seciton 4.4, Figure 6 Section 3.1, pp. 1-51.
Zhou Z., et al., "Edge Intelligence: Paving the Last Mile of Artificial Intelligence with Edge Computing", Proceedings of the IEEE, IEEE. New York, US, vol. 107, No. 8, Aug. 1, 2019 (Aug. 1, 2019), pp. 1738-1762, XP011738425, pp. 1-24, ISSN: 0018-9219, DOI:10.1109/JPROC.2019.2918951 [retrieved on Aug. 6, 2019] Section IV.C, Point 3.
Taiwan Search Report—TW110101252—TIPO—Mar. 26, 2024.

* cited by examiner

GRADIENT FEEDBACK FRAMEWORK FOR JOINT TRANSCEIVER NEURAL NETWORK TRAINING

CROSS-REFERENCE TO RELATED APPLICATION

The present application claims priority to U.S. Provisional Patent Application No. 62/980,941, filed on Feb. 24, 2020, and titled "GRADIENT FEEDBACK FRAMEWORK FOR JOINT TRANSCEIVER NEURAL NETWORK TRAINING," the disclosure of which is expressly incorporated by reference herein in its entirety

FIELD OF THE DISCLOSURE

Aspects of the present disclosure generally relate to wireless communication, and more particularly to techniques and apparatuses for jointly training transmitter and receiver artificial neural networks.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a fifth generation (5G) Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in NR and LTE technologies. Preferably, these improvements should be applicable to other multiple access technologies and the telecommunication standards that employ these technologies.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

According to an aspect of the present disclosure, a method of wireless communication determines a transmission reference point value. The method also determines a transmission reference point gradient of a loss based on the transmission reference point value. The method further transmits a message that includes the transmission reference point gradient to a transmitting device.

In another aspect, a method of wireless communication receives a transmission reference point gradient of a loss from a receiving device. The method also determines a transmission point-payload gradient of a transmission reference point value with respect to an encoded value generated by a transmitter neural network. The method also determines a payload gradient of the loss based on a product of the transmission reference point gradient and the transmission point-payload gradient. The method further updates weights of the transmitter neural network based on the payload gradient.

In another aspect of the present disclosure, an apparatus for wireless communications performed by a receiving device, includes a processor and memory coupled with the processor. Instructions stored in the memory are operable, when executed by the processor, to cause the apparatus to determine a transmission reference point value. The apparatus can also determine a transmission reference point gradient of a loss based on the transmission reference point value. The apparatus can further transmit a message that includes the transmission reference point gradient to a transmitting device.

In another aspect of the present disclosure, an apparatus for wireless communications by a transmitting device, includes a processor and memory coupled with the processor. Instructions stored in the memory are operable, when executed by the processor, to cause the apparatus to receive a transmission reference point gradient of a loss from a receiving device. The apparatus can also determine a transmission point-payload gradient of a transmission reference point value with respect to an encoded value generated by a transmitter neural network. The apparatus can also determine a payload gradient of the loss based on a product of the transmission reference point gradient and the transmission point-payload gradient. The apparatus can further update weights of the transmitter neural network based on the payload gradient.

In another aspect of the present disclosure, a receiving device for wireless communications includes means for determining a transmission reference point value. The receiving device also includes means for determining a transmission reference point gradient of a loss based on the transmission reference point value. The receiving device further includes means for transmitting a message that includes the transmission reference point gradient to a transmitting device.

In another aspect of the present disclosure, a transmitting device for wireless communications includes means for receiving a transmission reference point gradient of a loss from a receiving device. The transmitting device also includes means for determining a transmission point-payload gradient of a transmission reference point value with respect to an encoded value generated by a transmitter neural network. The transmitting device also includes means for determining a payload gradient of the loss based on a product of the transmission reference point gradient and the transmission point-payload gradient. The transmitting device further includes means for updating weights of the transmitter neural network based on the payload gradient.

In another aspect of the present disclosure, a non-transitory computer-readable medium with program code recorded thereon is disclosed. The program code is executed by a receiving device and includes program code to determine a transmission reference point value. The receiving device also includes program code to determine a transmission reference point gradient of a loss based on the transmission reference point value. The receiving device also includes program code to transmit a message comprising the transmission reference point gradient to a transmitting device.

In another aspect of the present disclosure, a non-transitory computer-readable medium with program code recorded thereon is disclosed. The program code is executed by a transmitting device and includes program code to receive a transmission reference point gradient of a loss from a receiving device. The transmitting device also includes program code to determine a transmission point-payload gradient of a transmission reference point value with respect to an encoded value generated by a transmitter neural network. The transmitting device also includes program code to determine a payload gradient of the loss based on a product of the transmission reference point gradient and the transmission point-payload gradient. The transmitting device further includes program code to update weights of the transmitter neural network based on the payload gradient.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
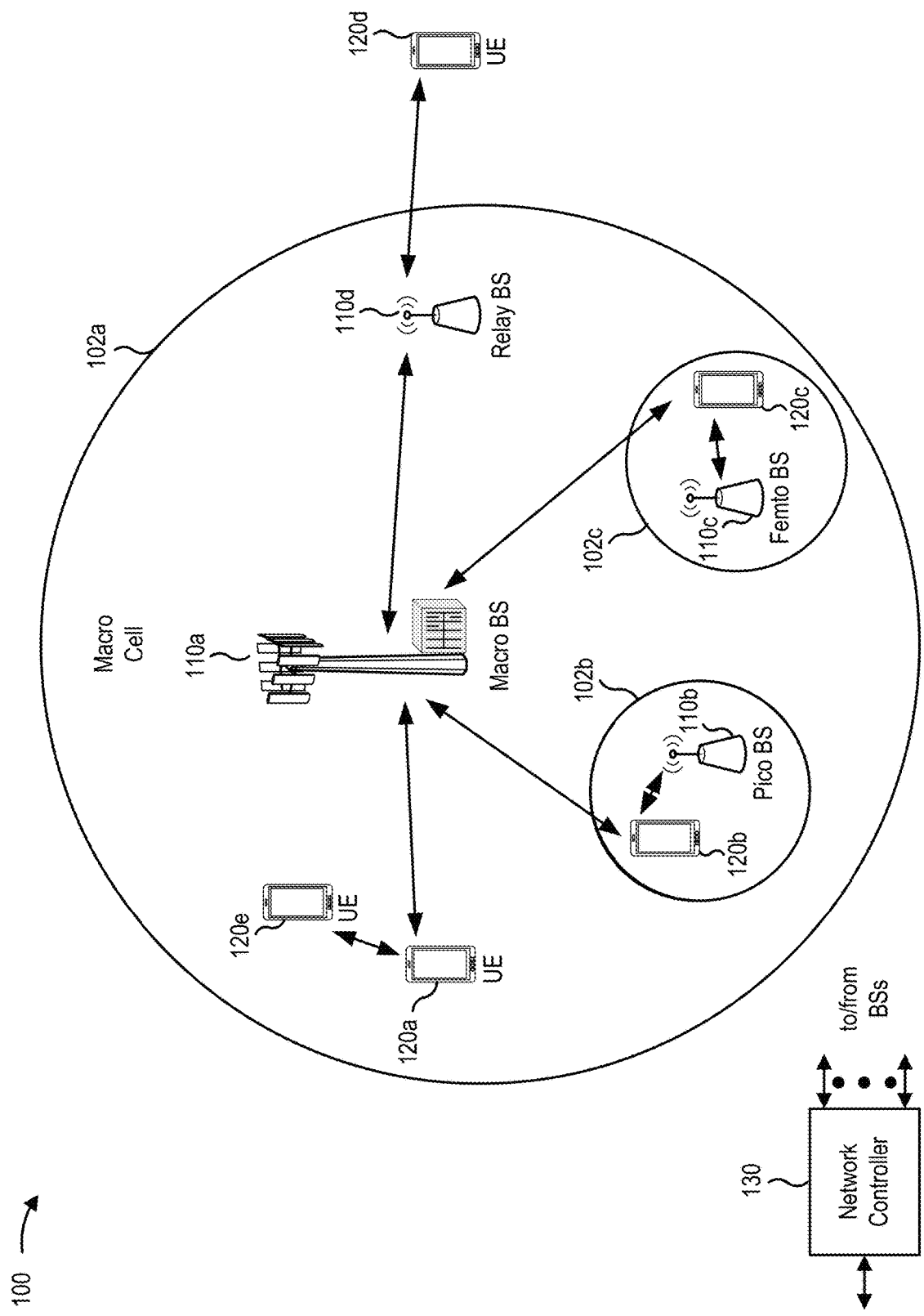
FIG. 1 is a block diagram conceptually illustrating an example of a wireless communication network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth. In addition, the scope of the disclosure is intended to cover such an apparatus or method which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

As is known to those of skill in the art, artificial neural networks are trained to perform a task. In most cases, a neural network is initially trained offline. However, offline training may fail to consider dynamic conditions of a real world environment, such as real world dynamic conditions of a UE and a base station. Online training may account for the real world dynamic conditions. Online training may be performed with known over-the-air transmissions (e.g., signaling) reflective of the wireless environment.

In one configuration, transmitter (Tx) and receiver (Rx) blocks may be jointly trained as a pair. Examples of jointly trained pairs include a neural network based encoder and decoder, a neural network based constellation mapper and demapper, and a neural network based transmitter waveform filtering and receiver waveform recovery.

In some cases, a transmitter and receiver neural network pair are initially trained offline with device models for transmitter/receiver chains and channel models linking the transmitter and receiver. Still, offline training may not be feasible because the transmitter and the receiver may be separately designed (for example, a proprietary implementation by different vendors) and/or the transmitter is unaware of the receiver's implementation, or vice versa. Even when offline training is feasible, online training may fine-tune the neural networks to address model mismatches. Additionally, or alternatively, online training may address part-to-part variations in device characteristics. Furthermore, the online training may address gaps between offline channel models and channels observed at deployment.

Aspects of the present disclosure are directed to joint online training of a transmitter neural network and a receiver neural network. In one configuration, a feedback mechanism conveys information for updating the transmitter neural network's parameters. The feedback mechanism enables online training.

In some implementations, a receiver estimates a value at a transmission reference point based on one or more values determined at the receiver. The transmission reference point may be a point in a processing pipeline of a transmitter. In some implementations, the transmission reference point corresponds to a point in the transmitter processing pipeline where a pilot signal is multiplexed with data. The value at the transmission reference point may be referred to as a payload, a processed transmitter payload, or a transmitter payload. The receiver may determine a transmission reference point gradient of a loss with respect to the payload. The receiver may transmit a feedback message to the transmitter, where the feedback message includes the transmission reference point gradient.

The feedback message and/or the transmission reference point gradient may be compressed. In some implementations, the receiver may accumulate a transmission reference point gradient over a number of time steps. The feedback message may include the accumulated gradient.

In one configuration, the receiver estimates a channel based on a received pilot signal. Additionally, the receiver may determine a value (for example, activation) at a pilot measuring point of the receiver. The pilot measuring point may correspond to a point in a receiver processing pipeline where the pilot is measured. The value at the pilot measuring point may be referred to as a processed received payload. The receiver (for example, receiver neural network) may determine a transmission point-pilot point gradient of the value at the pilot measuring point with respect to the value at the transmission reference point based on a channel estimate. The receiver may also determine a pilot measuring point gradient of a loss with respect to the value at the pilot measuring point. The transmission reference point gradient may be a product of the pilot measuring point gradient and the transmission point-pilot point gradient.

In one implementation, the receiver trains a non-linearity neural network to learn a non-linear channel response based on the received pilot signal. The value at the pilot measuring point may be generated by the non-linearity neural network. In one implementation, the value at the transmission reference point is determined based on a reference point function. The receiver may determine a reference point function gradient of the value at the transmission reference point with respect to an input to an input to the reference point function. The reference point function may be known by both a receiving device and the transmitting device.

It should be noted that while aspects may be described using terminology commonly associated with 5G and later wireless technologies, aspects of the present disclosure can be applied in other generation-based communication systems, such as and including 3G and/or 4G technologies.

FIG. 1 is a diagram illustrating a network 100 in which aspects of the present disclosure may be practiced. The network 100 may be a 5G or NR network or some other wireless network, such as an LTE network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
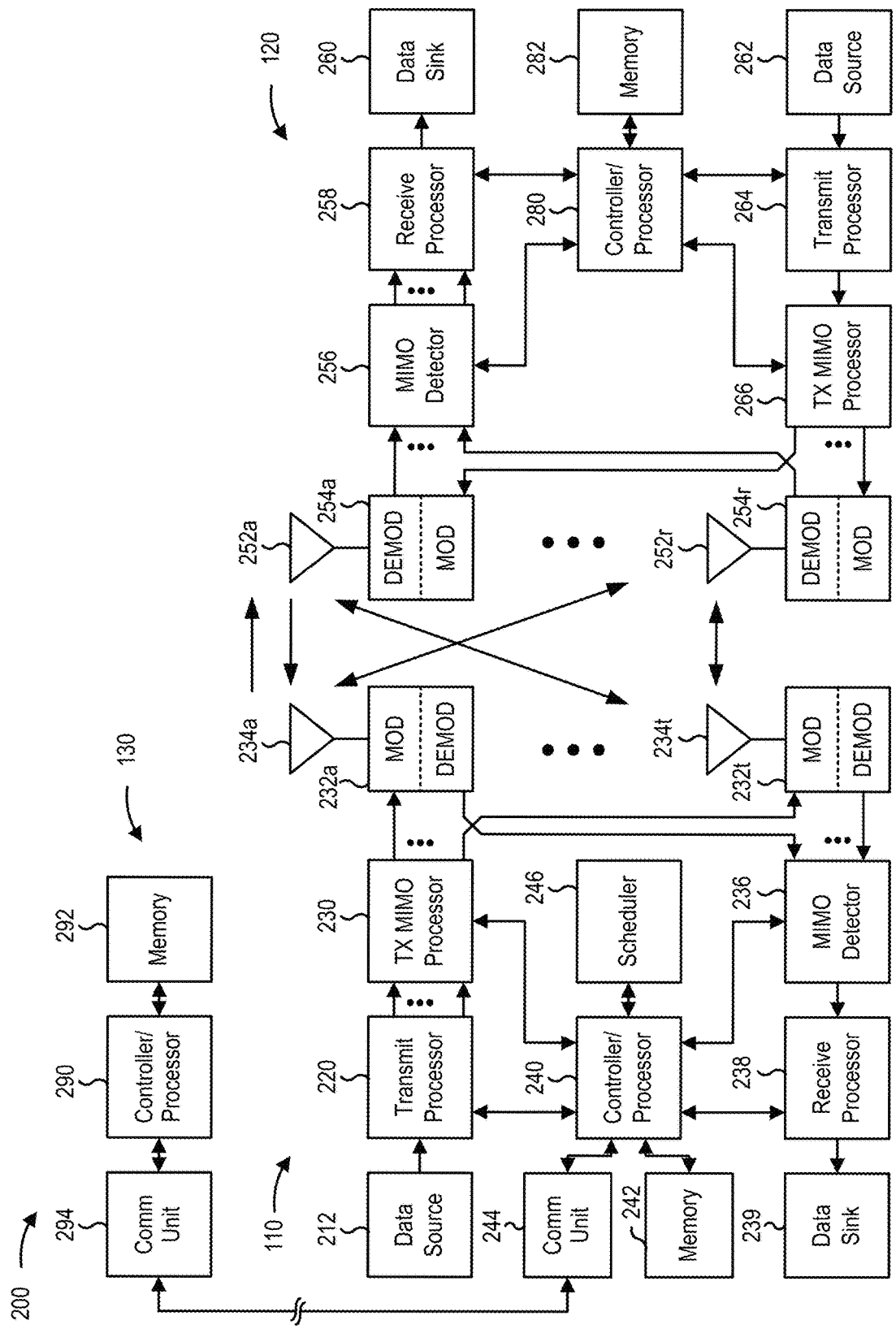
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 254, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with generating gradients for neural network training, as described in more detail elsewhere. For example, the controller/processor 240 of base station 110, controller/processor 280 of UE 120, and/or any other component(s) of FIG. 2 may perform or direct operations of, for example, the processes 900, 1000 of FIGS. 9 and 10 and/or other processes as described. Memories 242 and 282 may store data and program codes for base station 110 and UE 120, respectively. A scheduler 246 may schedule UEs for data transmission on the downlink and/or uplink.

In some aspects, the UE 120 may include means for determining a transmission reference point value; means for determining a transmission reference point gradient of a loss based on the transmission reference point value; means for transmitting a message that includes the transmission reference point gradient to a transmitting device.

In some aspects, the base station 110 may include means for receiving a transmission reference point gradient of a loss from a receiving device; means for determining a transmission point-payload gradient of a transmission reference point value with respect to an encoded value generated by a transmitter neural network; means for determining a payload gradient of the loss based on a product of the transmission reference point gradient and the transmission point-payload gradient; and means for updating weights of the transmitter neural network based on the payload gradient.

Such means may include one or more components of the UE 120 or base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communication (URLLC) applications, massive machine-type communication (mMTC) applications, enhanced mobile broadband (eMBB) applications, vehicle-to-anything (V2X) applications, and/or the like. Furthermore, in some cases, a single device may support different applications or services simultaneously.

Figure 3:
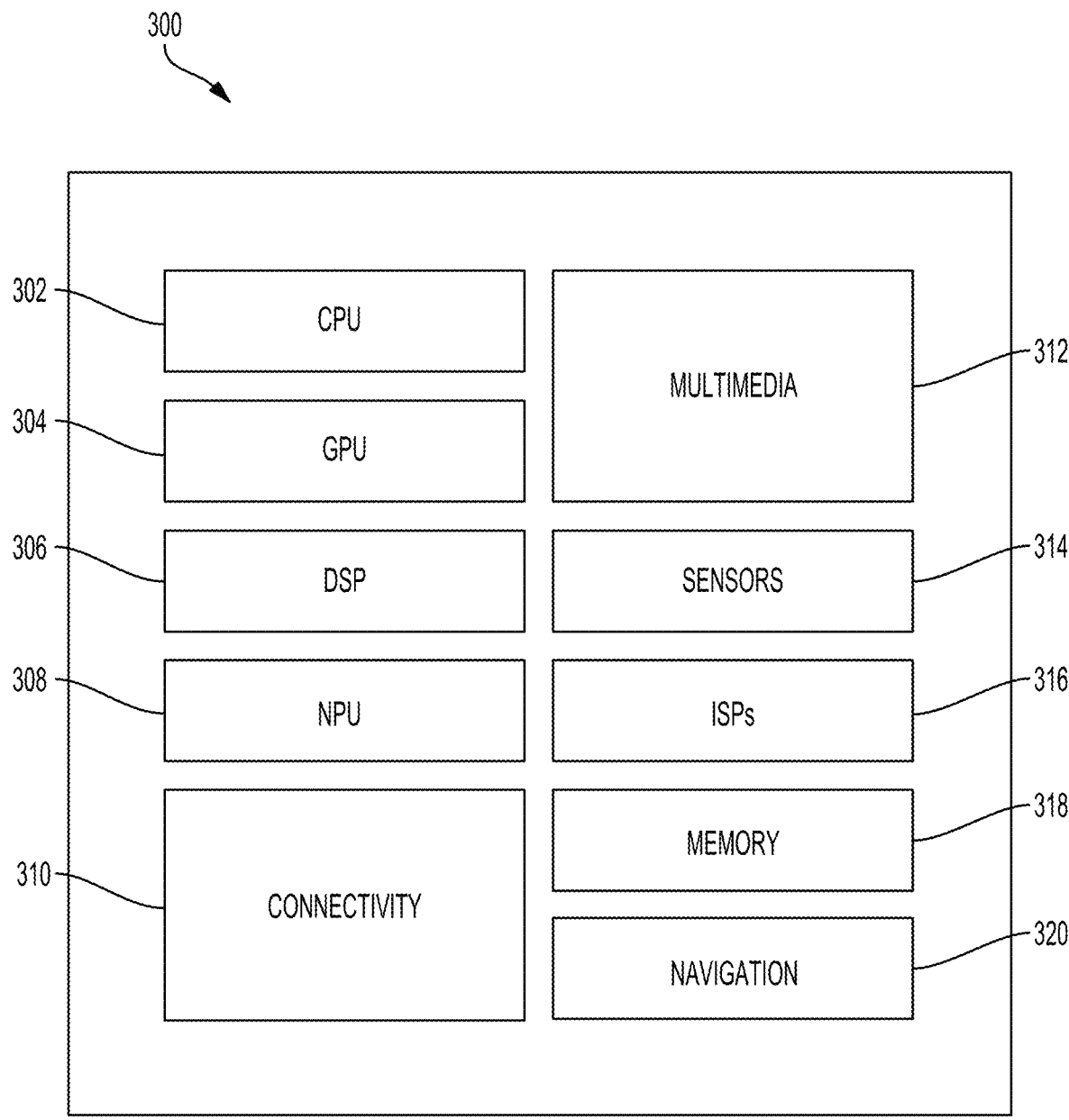
FIG. 3 illustrates an example implementation of designing a neural network using a system-on-a-chip (SOC), including a general-purpose processor in accordance with certain aspects of the present disclosure.

FIG. 3 illustrates an example implementation of a system-on-a-chip (SOC) 300, which may include a central processing unit (CPU) 302 or a multi-core CPU configured for generating gradients for neural network training, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In an aspect of the present disclosure, the instructions loaded into the general-purpose processor 302 may comprise code to determine an activation of a transmission reference point; code to determine a first gradient of a loss based on the activation at the transmission reference point; and code to transmit the first gradient of the loss to a transmitting device. The instructions loaded into the general-purpose processor 302 may also comprise code to receive a first gradient of a loss from a receiving device; code to determine a second gradient of a payload with respect to an activation of a transmitter neural network; code to determine a third gradient of the loss based on a product of the first gradient and the second gradient; and code to update weights of the transmitter neural network based on the third gradient.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
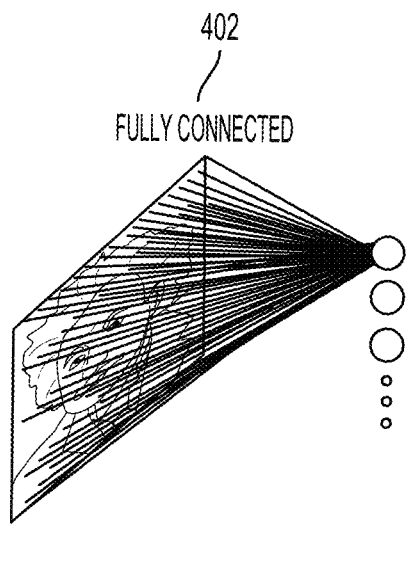
FIGS. 4A, 4B, and 4C are diagrams illustrating a neural network in accordance with aspects of the present disclosure.
Figure 4B:
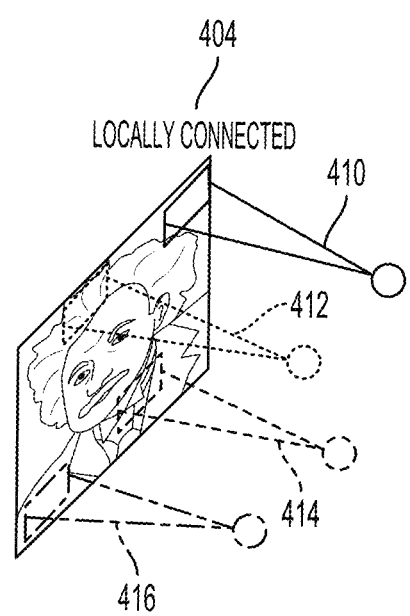

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
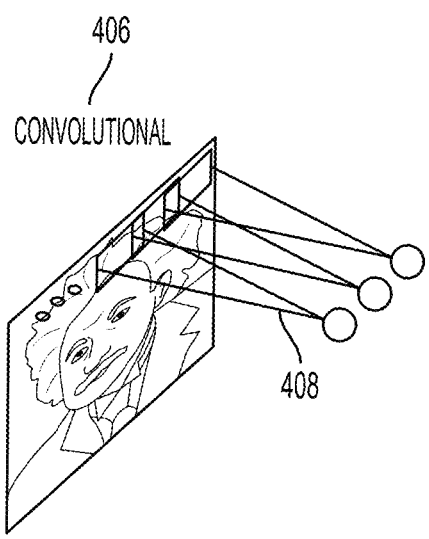

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
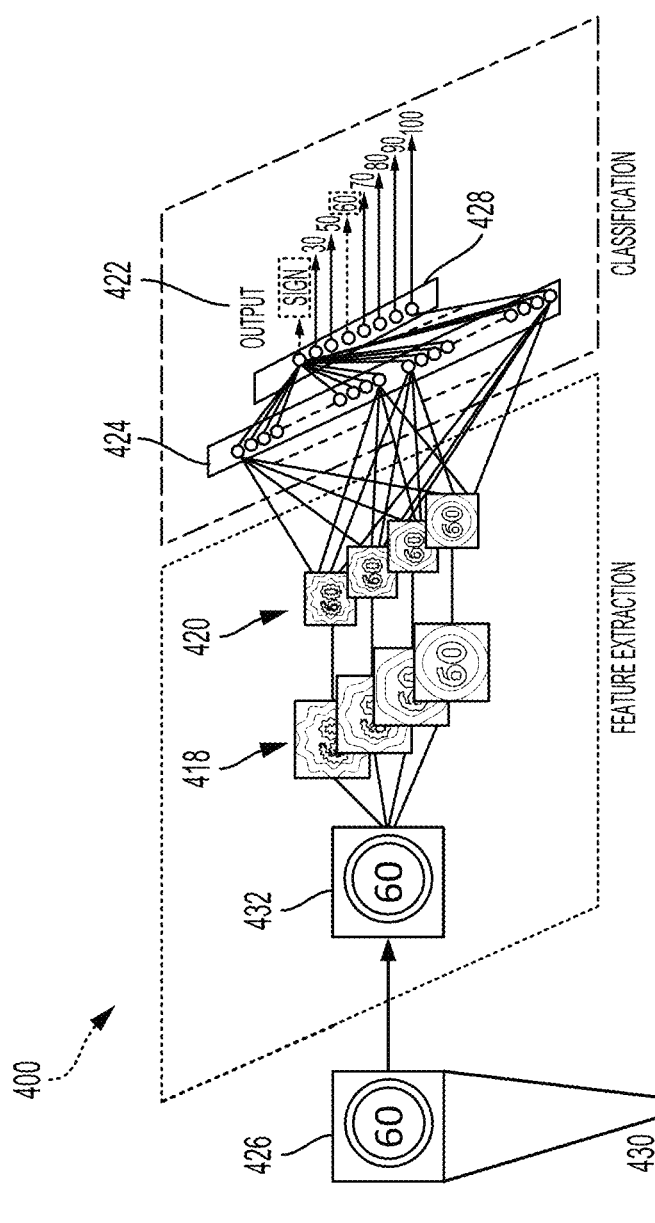
FIG. 4D is a diagram illustrating an exemplary deep convolutional network (DCN) in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, $\max(0, x)$. Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
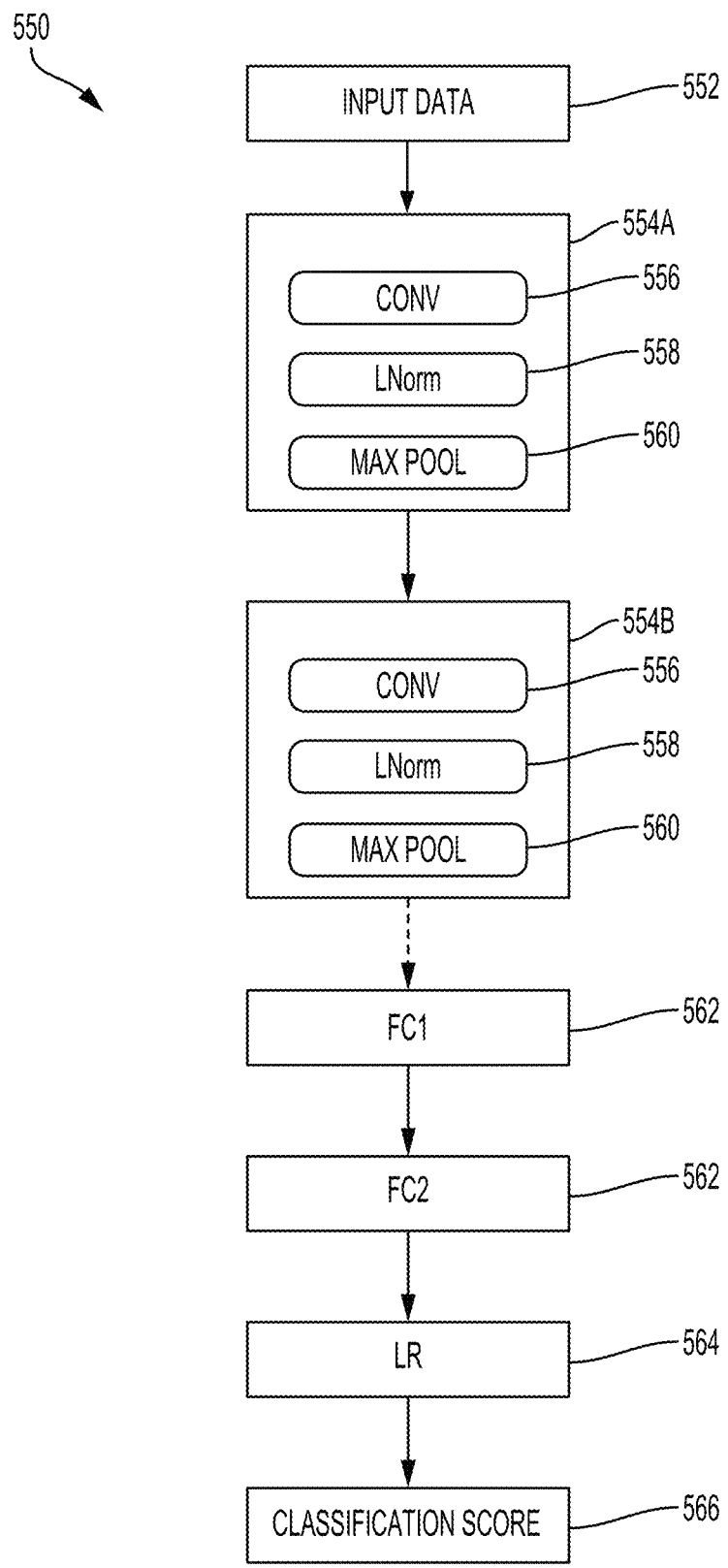
FIG. 5 is a block diagram illustrating an exemplary deep convolutional network (DCN) in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 356, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

As indicated above, FIGS. 3-5 are provided as examples. Other examples may differ from what is described with respect to FIGS. 3-5.

Artificial intelligence (AI) (for example, machine learning (ML)) functions may improve wireless communications. In some examples, the AI module is executed at the UE and/or the base station. For example, the AI module may be executed on both the UE and base station for a distributed function.

As is known to those of skill in the art, artificial neural networks are trained to perform a task. In most cases, a neural network is initially trained offline. However, offline training may fail to consider dynamic conditions of a real world environment, such as real world dynamic conditions of a UE and a base station. Online training may account for the real world dynamic conditions. Online training may be performed with known over-the-air transmissions (for example, signaling) reflective of the wireless environment.

In one configuration, transmitter (Tx) and receiver (Rx) blocks may be jointly trained as a pair. Examples of jointly trained pairs include a neural network based encoder and decoder, a neural network based constellation mapper and demapper, and a neural network based transmitter waveform filtering and receiver waveform recovery.

In some cases, a transmitter and receiver neural network pair is initially trained offline with device models for transmitter/receiver chains and channel models linking the transmitter and receiver. Still, offline training may not be feasible because the transmitter and the receiver may be separately designed (for example, a proprietary implementation by different vendors) and/or the transmitter is unaware of the receiver's implementation, or vice versa.

Even when offline training is feasible, online training may fine-tune the neural networks to address model mismatches, such as device non-linearities that cannot be accurately modeled during offline training and/or due to device aging. Additionally, or alternatively, online training may address part-to-part variations in device characteristics. The variations may be due to pre-training on the representative model. Furthermore, online training may address gaps between offline channel models and channels observed at deployment. Aspects of the present disclosure are directed to joint online training of a transmitter neural network and a receiver neural network.

Neural networks may be trained by back-propagating gradients of a loss function. Back-propagation refers to a process of updating weights of the neural network to reduce a prediction error. In one configuration, the receiver neural network calculates a loss (for example, an error in a prediction). Weights and/or parameters of the receiver neural network may be updated based on the loss calculated at the receiver.

When the loss is calculated at the receiver, it may be difficult to update weights and/or parameters of the transmitter neural network. The transmitter neural network's weights may be updated based on gradients back-propagated by a receiver (for example, receiver neural network) via an over-the-air channel. Although the transmitter may receive the back-propagated gradients, the transmitter may be unaware of the loss calculated at the receiver, parameters of the receiver neural network, conditions of the over-the-air channel, and/or other scaling quantities. Additionally, the receiver may lack information regarding the transmitter neural network. That is, the receiver neural network does not know what information is needed by the transmitter neural network.

In one configuration, a feedback mechanism conveys information for updating the transmitter neural network's parameters. The feedback mechanism enables online training.

Figure 6A:
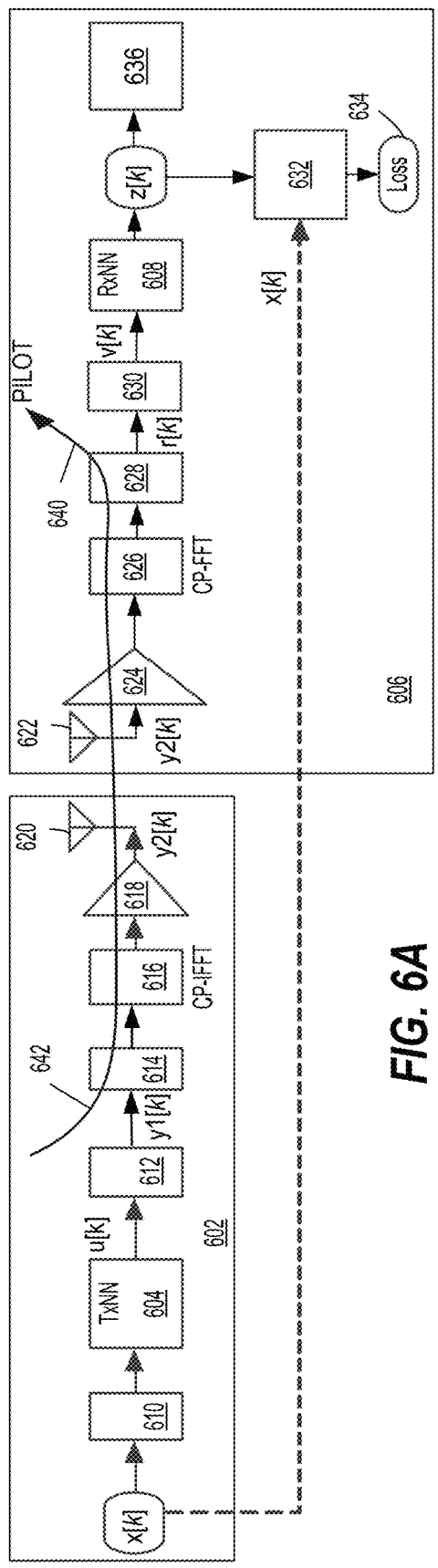
FIG. 6A illustrates an exemplary transmitter processing pipeline for a transmitter including a transmitter neural network (TxNN) and an exemplary receiver processing pipeline for a receiver including a receiver neural network (RxNN), in accordance with aspects of the present disclosure.

FIG. 6A illustrates an example 600 of a transmitter processing pipeline for a transmitter 602 including a transmitter neural network 604 (TxNN) and a receiver processing pipeline for a receiver 606 including a receiver neural network 608 (RxNN) according to aspects of the present disclosure. The TxNN 604 and RxNN 608 may each be part of an SOC, such as the SOC 300 as described with reference to FIG. 3. In some examples, the transmitter 602 may be in a base station, such as the base station 110 as described with reference to FIGS. 1-2. The receiver 606 may be in a UE, such as the UE 120 as described with reference to FIGS. 1-2.

As shown in FIG. 6A, a transmitter 602 generates a payload x[k] for example, a value of x at the subcarrier index [k] intended to be transmitted to the receiver 606. The payload may be generated by, for example, one or more of the controller/processor 240, the transmit processor 220, data source 212, and/or another component of the base station 110, as described with reference to FIG. 2. The payload x[k] may be a symbol, such as a quadrature amplitude modulation (QAM)-modulated symbol. That is, the payload x[k] represents source data intended for transmission to the receiver 606 over one or more channels. In some implementations, the payload x[k] may be referred to as a reconstruction target.

In one configuration, the payload x[k] is processed via the TxNN 604 to generate an encoded payload u[k]. The TxNN 604 may be an encoder, constellation mapper, waveform clipper, or another type of artificial neural network. For ease of explanation, in the example of FIG. 6A, the TxNN 604 may encode the payload x[k].

As shown in FIG. 6A, the payload x[k] may be processed by a first transmitter block 610 before the payload x[k] is encoded by the TxNN 604. The first transmitter block 610 may process the payload x[k] (for example, encode, demodulate, etc.). As an example, the first transmitter block 610 may be the transmit processor 220, TX MIMO processor 230, modulator 232a, and/or another component as described with reference to FIG. 2.

The output of the TxNN 604 (for example, encoded payload u[k]) may be processed by additional transmitter blocks, such as one or more of a second transmitter block 612, a third transmitter block 614, a cyclic prefix (CP) inverse fast Fourier transform (IFFT) module 616, and power amplifier (PA) 618. The second transmitter block 612, third transmitter block 614, CP-IFFT 616, and PA 618 may encode, modulate, transform, and/or process the encoded payload u[k]. The second transmitter block 612, third transmitter block 614, CP-IFFT 616, and PA 618 may be one or more of the transmit processor 220, TX MIMO processor 230, modulator 232a, and/or another component as described with reference to FIG. 2.

The second transmitter block 612 generates a processed transmitter payload y1[$k$]. The processed transmitter payload y1[$k$] may be further processed by one or more of the third transmitter block 614, CP-IFFT 616, and PA 618. One or more transmitter antennas 620 may transmit the processed transmitter payload y2[$k$] to the receiver 606.

For ease of explanation, the value y1[$k$] input for further processing by one or more of the third transmitter block 614, CP-IFFT 616, and PA 618 may be referred to as the transmission reference point value y1[$k$]. The value y2[$k$] transmitted to the receiver may be referred to as the transmitted payload y2[$k$].

The transmitted payload y2[$k$] may be received by one or more receiver antennas 622 and processed by one or more of a low noise amplifier (LNA) 624, a CP fast Fourier transform (FFT) module 626, and first receiver block 628. The LNA 624, CP-FFT module 626, and first receiver block 628 may be one or more of the receive processor 258, controller/processor 260, and/or another component as described with reference to FIG. 2.

The first receiver block 628 may output a first processed received payload r[k]. A second receiver block 630 may further process the first processed received payload r[k] to generate a second processed received payload v[k]. For ease of explanation, the first processed received payload r[k] may be referred to as a reference point value. The first receiver block 628 and second receiver block 630 may perform various functions, such as decoding, de-modulating, and/or other processes. The second receiver block 630 may be one or more of the demodulator 254a, receive processor 258, controller/processor 260, and/or another component as described with reference to FIG. 2.

The RxNN 608 may receive the second processed received payload v[k] and output a decoded payload z[k]. The RxNN 608 may be trained for decoding, demapping, waveform recovery, and/or other processes. For ease of explanation, the RxNN 608 is trained to decode the second processed received payload v[k]. In one configuration, a loss module 632 compares the decoded payload z[k] and a ground-truth value (for example, the payload x[k]) to determine a loss 634. The ground-truth value x[k] may be conveyed by the transmitter 602 or reconstructed at the receiver by other means. One or more additional modules 634 of the receiver 606 may further process the decoded payload z[k].

In one configuration, the transmitted payload y[k] (shown as y2[$k$] in FIG. 6A) may be scaled based on a scaling value H[k]. The scaling value H[k] may be a channel estimate determined from a pilot. The pilot's value is known to both the transmitter 602 and the receiver 606. The received pilot includes the effects of transmitter 602 and receiver 606 scaling (for example, power amplifier (PA), low-noise amplifier (LNA), automatic gain control (AGC), second transmitter block 612, and/or third transmitter block 614). The receiver 606 may estimate the channel between the transmitter 602 and the receiver 606 based on the received pilot.

The loss module 632 may implement a loss function L(x[k], z[k], H[k]) (e.g., L(x[k], z[k], H[k])=$\Sigma_k$|Z[k]−H[k]x[k]|$^2$) for computing the loss 634 at the receiver 632 based on the decoded payload z[k] in view of the ground truth x[k] and the scaling value H[k]. The ground truth x[k] is either conveyed by the transmitter or reconstructed at the receiver. The loss module 632 may determine a gradient of the loss 634 with respect to the decoded payload z[k]. Weights of the RxNN 608 may be adjusted towards a direction (for example, positive or negative) that reduces (for example, minimizes) the loss 634. That is, the gradient of the loss 634 with respect to the decoded payload z[k] ($\nabla_z L$) may train the RxNN 608. The gradient of the loss 634 ($\nabla_z L$) may be determined at the receiver 606. Aspects of the disclosure are not limited to estimating the decoded payload z[k] with the RxNN 608, other methods for estimating are contemplated.

Weights of the TxNN 604 may be updated based on a gradient of the loss (L) with respect to the encoded payload u[k] ($\nabla_u L$). The gradient of the loss with respect to the encoded payload u[k] ($\nabla_u L$) may be the product of a combination of losses, such as ($\nabla_v L \cdot \nabla_y v(H \circ y) \cdot \nabla_u y(u)$). For example, the gradient of the loss with respect to the encoded payload u[k] ($\nabla_u L$) may be the product of the gradient of the loss with respect to the pilot measuring point value r[k] ($\nabla_r L$), the gradient of the pilot measuring point value r[k] with respect to the transmission reference point value y1[$k$] ($\nabla_y r$), the channel estimate H, the gradient of the transmission reference point value y1[$k$] with respect to the encoded payload u[k] ($\nabla_u y$), a transmission reference point value y1, and a value of the encoded payload u.

In other implementations, the gradient of the loss with respect to the encoded payload u[k] ($\nabla_u L$) may be the product of the gradient of the loss with respect to the second processed received payload v[k] ($\nabla_v L$), the gradient of the second processed received payload v[k] with respect to the transmission reference point value y1[$k$] ($\nabla_y v$), the channel estimate H, the gradient of the transmission reference point value y1[$k$] with respect to the encoded payload u[k] (V0), a transmission reference point value y, and a value of the encoded payload u.

The channel estimate H, the gradient of the loss with respect to the pilot measuring point value r[k] ($\nabla_r L$), and/or the gradient of the pilot measuring point value r[k] with respect to the transmission reference point value y1[$k$] ($\nabla_y r$) may not be known at the transmitter 602. Other values, such as the second processed received payload v[k] and corresponding gradients may not be known at the transmitter 602. For example, the transmitter 602 may be unaware of the receiver's 606 structure or may be unaware of the RxNN 608. Because the transmitter 602 may be unaware of one or more gradients or values (e.g., $\nabla_r L$, $\nabla_y r$, and/or H), the transmitter 602 may not determine the gradient of the loss for updating weights (e.g., training) the TxNN 604.

Additionally, the gradient of the transmission reference point value y1[$k$] with respect to the encoded payload u[k] ($\nabla_u y$) and/or a value of the processed transmitter payload y may not be known at the receiver 606. For example, the receiver 606 may be unaware of the TxNN 604 and/or the transmitter blocks 610, 612, 614. Still, although the receiver 606 may be unaware of the third transmitter block 614, an effect of the third transmitter block 614 may be measured as a part of the channel estimate H. Additionally, an effect of a first receiver block 628 may be measured as a part of the channel estimate H.

In one configuration, the receiver stores the pilot measurement point value r[k] at a pilot measurement point 640 and estimates a payload (y[k]) at a transmission reference point 642 from the relationship: r[k]=H[k]y[k]+noise (for example, (r[k]−noise)/H[k]=y[k]). In this example, the transmission reference point 642 corresponds to a point where the pilot is multiplexed with data. In this example, the receiver 606 may not know what the transmission reference point 642 represents. The channel estimate H[k] may be calculated based on the pilot. Therefore, based on the pilot measurement point value r[k], the receiver may estimate the transmission reference point value y1[k]. The receiver may then determine a gradient of the second pilot measurement point value r[k] with respect to the transmission reference point value y1[k] (e.g., $\nabla_y r$). For ease of explanation, the gradient of the pilot measurement point value r[k] with respect to the transmission reference point value y1[k] ($\nabla_y r$) may be referred to as the transmission point-pilot point gradient.

In one implementation, the receiver 606 computes the gradient of the loss with respect to the transmission reference point value y1[k] ($\nabla_y L$), which may be the product of $\nabla_r L$ and $\nabla_y L$ where $\nabla_r L$ is the gradient of the loss with respect to the pilot measurement point value r[k], and $\nabla_y r$ is the transmission point-pilot point gradient. For ease of explanation, the gradient of the loss with respect to the pilot measurement point value r[k]($\nabla_r L$) may be referred to as a pilot measuring point gradient. The gradient of the loss with respect to the transmission reference point value y1[k] ($\nabla_y L$) may be referred to as a transmission reference point gradient.

The receiver 606 transmits a message including the transmission reference point gradient (e.g., $\nabla_y L$) to the transmitter 602. In the current implementation, the transmitter 602 is aware of the value of the transmission reference point value y1[k] at the transmission reference point 642, and may apply the chain rule for back-propagation: $\nabla_u L = \nabla_y L \cdot \nabla_u y$. That is, the transmitter 602 determines the gradient of the transmission reference point value y1[k] with respect to the encoded payload u[k] ($\nabla_u y$) based on the values of the transmission reference point value y1[k] and the encoded payload u[k]. $\nabla_u L$ is the gradient of the loss with respect to the encoded payload u[k] (for example, the output of the TxNN 604). For ease of explanation, the gradient of the transmission reference point value y1[k] with respect to the encoded payload u[k] ($\nabla_u y$) may be referred to as the transmission point-payload gradient, and the gradient of the loss with respect to the encoded payload u[k] ($\nabla_u L$) may be referred to as the payload gradient.

Figure 6B:
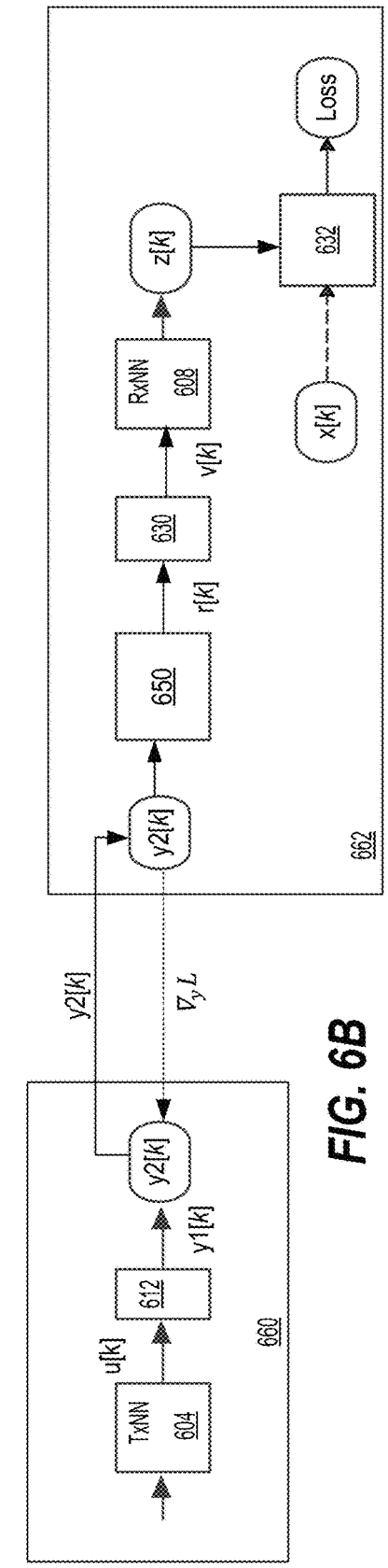
FIG. 6B illustrates an example of a transmitter model for computing a gradient for a TxNN at a transmitter and a receiver model for computing a gradient of a RxNN at a receiver, in accordance with aspects of the present disclosure.

FIG. 6B illustrates an example 650 of a transmitter model 660 for computing a gradient for a TxNN 604 at a transmitter 602 (not shown in FIG. 6B) and a receiver model 662 for computing a gradient of a RxNN 608 at a receiver 606 (not shown in FIG. 6B). As shown in FIG. 6B, the transmitter model 660 transmits a transmitted payload y[k], as described above with reference to FIG. 6A. In this example, a channel estimation module 650 generates a pilot measuring point value r[k]. The pilot measuring point value r[k] may be an element-wise product of the transmitted payload y[k] and the channel estimate H[k].

The receiver model 662 proceeds to determine a decoded payload z[k] and a loss 634, as described above with reference to FIG. 6A. The receiver model 662 may transmit a gradient of the loss with respect to the processed transmitter payload y[k] ($\nabla_u L$) to the transmitter model 660. The gradient of the loss with respect to the processed transmitter payload y[k] ($\nabla_y L$) may be determined as described above with reference to FIG. 6A. Based on the gradient of the loss with respect to the transmission reference point y1[k] ($\nabla_y L$), the transmitter model 660 may determine the gradient of the loss with respect to the encoded payload u[k] ($\nabla_u L$), as described above with reference to FIG. 6A.

In some implementations, the receiver 606 may implement a second RxNN ($f_H()$) to represent an effective channel (e.g., non-linearity) response from the transmission reference point 642 to the pilot measurement point 640, such that r=$f_H$(y)+noise, where r is the estimate value of the pilot measuring point value r[k] at the pilot measurement point 640 and $f_H$( ) is a function of the second RxNN.

Figures 7A, 7B:
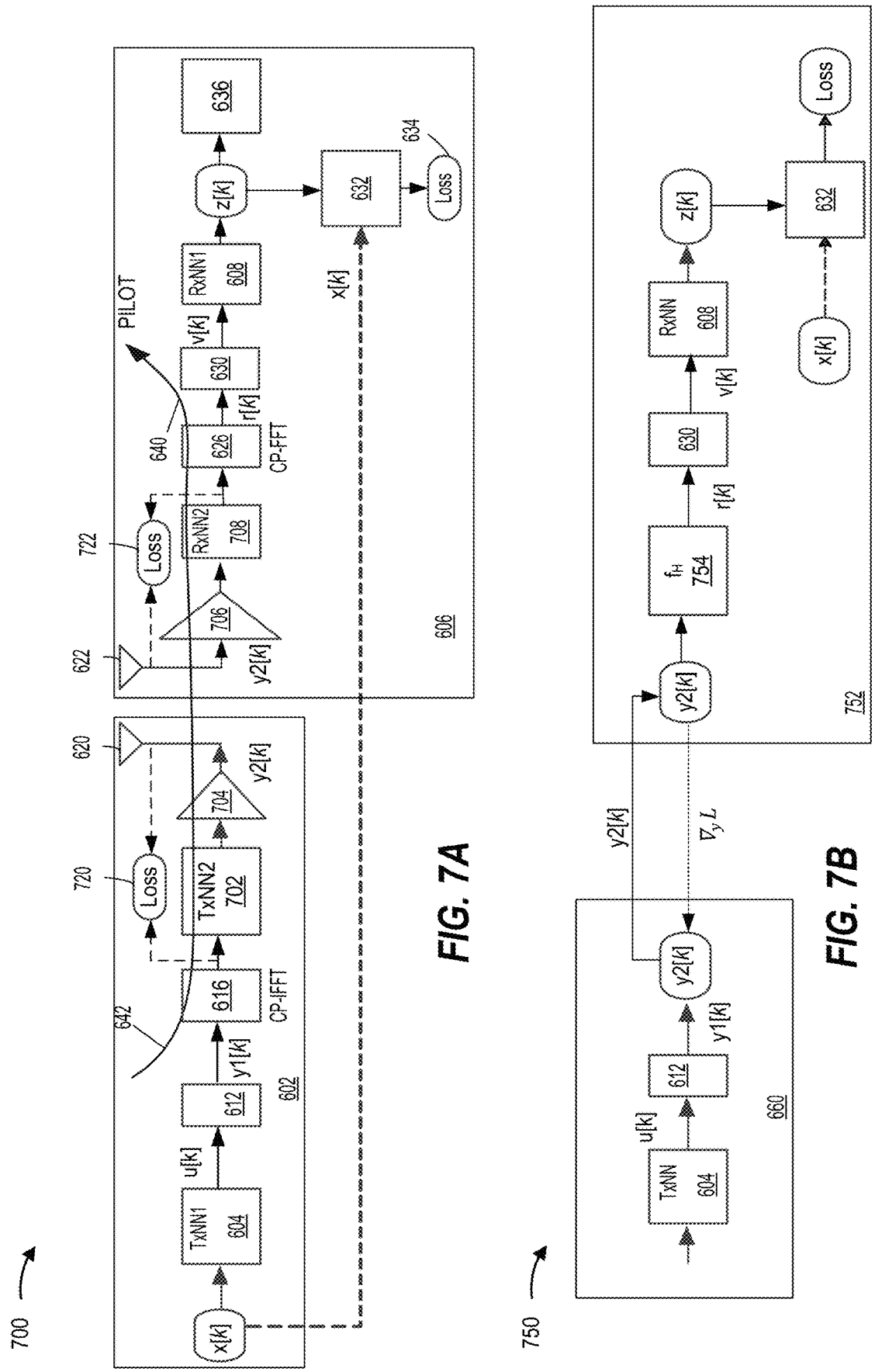
FIG. 7A illustrates an exemplary processing pipeline of a receiver and a transmitter, in accordance with aspects of the present disclosure.
FIG. 7B illustrates an example of a transmitter model and a receiver model, in accordance with aspects of the present disclosure.

FIG. 7A illustrates an example 700 of a receiver 606 implementing a first RxNN 608 and a second RxNN 708 according to aspects of the present disclosure. As shown in FIG. 7A, the transmitter 602 and the receiver 606 may use nested neural networks. For example, as shown in FIG. 7A, the transmitter 602 includes a second TxNN (TxNN2) 702 trained at the transmitter 602 to mitigate transmitter non-linearity. That is, the second TxNN 702 may calculate a loss 720 between a pilot signal output from the CP-IFFT and the pilot signal output from a power amplifier 704. The second TxNN 702 may be trained to reduce or minimize the loss 720. The receiver 606 may be unaware of the second TxNN 702.

As described above, the receiver 606 may train and maintain a second RxNN (RxNN2) 708. The second RxNN 708 may be a non-linearity neural network representing an effective channel (for example, non-linearity) response from the transmission reference point 642 to the pilot measurement point 640. The second RxNN 708 may be trained on the received pilot to addresses non-linearity. For example, the second RxNN 708 may be trained to reduce a loss 722 between the pilot signal received at a low noise amplifier 706 and the pilot signal output from the second RxNN 708. In one configuration, the second RxNN 708 may be limited to determining the transmission reference point gradient (V L).

In the example of FIG. 7A, the receiver 606 computes the loss (L) with respect to the transmission reference point y1[k] ($\nabla_y L$), where $\nabla_y L = \nabla_r L \cdot \nabla_y r$, where $\nabla_r L$ is the pilot measuring point gradient, $\nabla_y r$ is the transmission point-pilot point gradient, and r is based on $f_H(y)$ (for example, the activation of second RxNN 708). The output of the second RxNN 708 may also be referred to as the activation of the second RxNN 708. As described above, with reference to FIGS. 6A and 6B, the receiver 606 may transmit a message including the transmission reference point gradient ($\nabla_y L$) to the transmitter 602. Based on the received transmission point reference gradient ($\nabla_y L$), the transmitter 602 may determine the gradient of the loss with respect to the encoded payload u[k] ($\nabla_u L$), as described above with reference to FIGS. 6A and 6B.

FIG. 7B illustrates an example 750 of a transmitter model 660 and a receiver model 752 according to aspects of the present disclosure. As described with reference to FIG. 6B, the transmitter model 660 computes a gradient for a TxNN 604 at a transmitter 602 (not shown in FIG. 7B). Additionally, the receiver model 752 determines a gradient of a RxNN 608 at a receiver 606 (not shown in FIG. 6B). In this example, the receiver model 752 includes a second RxNN 754 ($f_H$) for generating an estimate of a pilot measuring point value r[k]. As described above, r=$f_H$(y)+noise. The second receiver block 630 may receive the estimated pilot measuring point value r[k] to generate a second processed received payload v[k]. After determining the second processed received payload v[k], the gradient of the loss with respect to the transmission reference point y[k] ($\nabla_y L$) may be determined as described above with reference to FIGS. 6A and 6B.

Figure 8:
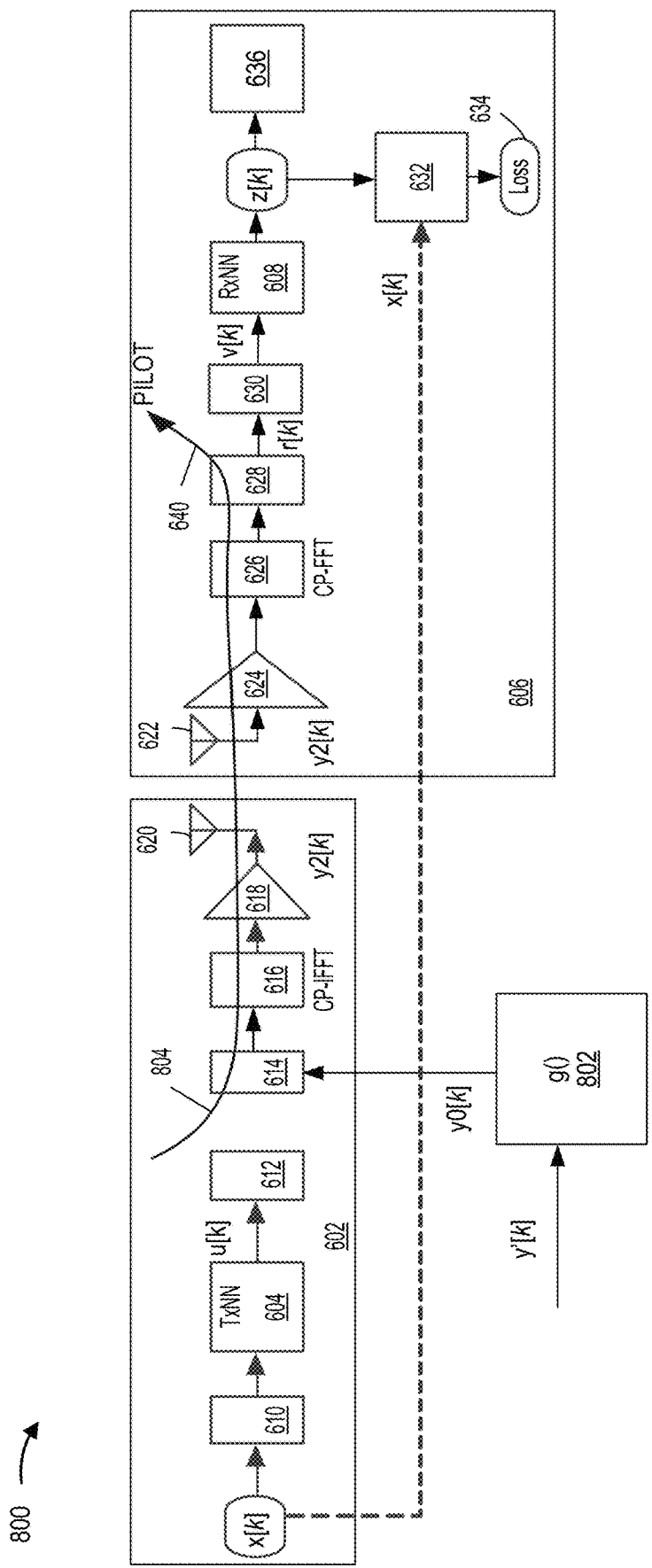
FIG. 8 illustrates an exemplary processing pipeline of a receiver and a transmitter, in accordance with aspects of the present disclosure.

In some implementations, the transmitter 602 and the receiver 606 may agree on an arbitrary transmission reference point for gradient feedback. The transmitter 602 and the receiver 606 may also agree on the operation (for example, reference point function) related to the agreed transmission reference point. FIG. 8 illustrates an example 800 of a transmitter 602 including an agreed transmission reference point 804 according to aspects of the present disclosure. As shown in FIG. 8, the transmitter 602 and the receiver 606 agree on a transmission reference point 804 for gradient feedback. Additionally, the transmitter 602 and the receiver 606 agree on a reference point function 802 g( ), where y=g[y']. The transmitter 602 and the receiver 606 also agree that the gradient feedback from the receiver 606 should be referenced at y' as $\nabla_{y'} L = \nabla_v L \cdot \nabla_y v \cdot \nabla_{y'} y$, where y=g(y').

Alternatively, $\nabla_{y'} L = \nabla_r L \cdot \nabla_y r \cdot \nabla_{y'} y$, where $\nabla_{y'} L$ is the gradient of the loss (L) with respect to the input y' to the reference point function 802, $\nabla_{y'} y$ is the gradient of the estimated transmission point value y0[k] (for example, output of the reference point function 802 with respect to the input y' of the reference point function 802). For ease of explanation, the gradient of the loss (L) with respect to the input y' to the reference point function 802 ($\nabla_{y'} L$) may be referred to as a reference point function gradient. Additionally, the gradient of the estimated transmission point value y0[k] (for example, output of the reference point function 802 with respect to the input y' of the reference point function 802 ($\nabla_{y'} y$) may be referred to as the reference point input-output gradient.

The transmitter 602 may use the reference point function 802 as a point for feedback. The transmitter 602 does not use the reference point function 802 for other communications with the receiver. In the current example, the receiver 606 determines the estimated transmission point value y0 [k] based on the pilot measuring point value r[k], the noise, and the channel estimate H[k], where r[k]=H[k]·y0[k]+noise, such that y0[k]=(r[k]−noise)/H[k]. As described above, the receiver 606 may determine the channel estimate H[k] based on the pilot signal. By determining y0[k] and knowing the reference point function g( ), the receiver may determine the input y' of the reference point function 802. Feedback overhead may be reduced because the input y' of the reference point function 802 may have a smaller dimension than the transmitted payload y2[k].

The reference point function 802 may be determined by the transmitter 602 and conveyed to the receiver 602. Alternatively, in some implementations, the reference point function 802 may be determined by the receiver 606 and conveyed to the transmitter 602. In this implementation, the receiver 606 may be in a base station (for example, gNB) receiving an uplink communication from the transmitter 602 (for example, in the UE). In another configuration, the reference point function 802 may be fixed or deterministic as specified in a wireless standard/specification. The reference point function 802 may be time varying in a pre-determined manner, such that different projections of the original gradient $\nabla_y L$ may be sampled over time.

The receiver 606 may compress the gradient ($\nabla_y L$) and the transmitter 602 may decompress the gradient ($\nabla_y L$) to reduce feedback overhead. That is, decompression may be applied to recover the gradient ($\nabla_y L$) from the compressed feedback. Additionally, or alternatively, to reduce feedback overhead, the receiver 606 may accumulate gradient updates over multiple time steps (or use alternative methods to summarize gradients over multiple time steps) and feedback the result. For example, the receiver 606 may accumulate the gradient over multiple symbols before transmitting the gradient to the transmitter 602. This process may be similar to a mini batch process.

Figure 9:
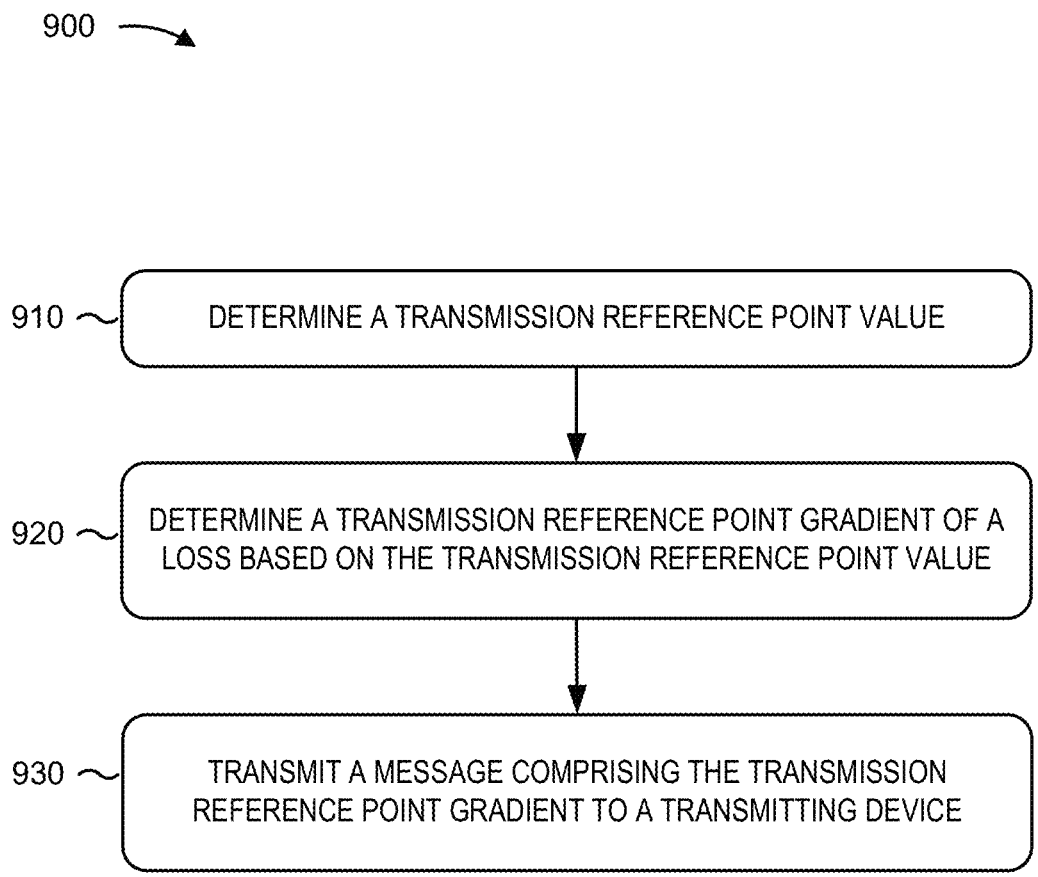
FIG. 9 is a diagram illustrating an example process performed, for example, by a receiving device, in accordance with various aspects of the present disclosure.

FIG. 9 is a diagram illustrating an example process 900 performed, for example, by a device in accordance with various aspects of the present disclosure. The example process 900 is an example of a gradient feedback framework for joint transceiver neural network training.

As shown in FIG. 9, in some aspects, the process 900 may include determining a transmission reference point value (block 920). For example, the UE (e.g., using the controller/processor 280, memory 282, the SOC 300, and/or the like) can determine a transmission reference point value.

As shown in FIG. 9, in some aspects, the process 900 may include determining a transmission reference point gradient of a loss based on the transmission reference point value (block 920). For example, the UE (e.g., using the controller/processor 280, memory 282, the SOC 300, and/or the like) can determine a transmission reference point gradient of a loss.

As shown in FIG. 9, in some aspects, the process 900 may include transmitting a message comprising the transmission reference point gradient to a transmitting device (block 930). For example, the UE (e.g., using the antenna 252, MOD 254, TX MIMO processor 266, transmit processor 264, controller/processor 280, memory 282, and/or the like) can transmit a message comprising the transmission reference point gradient to a transmitting device.

Figure 10:
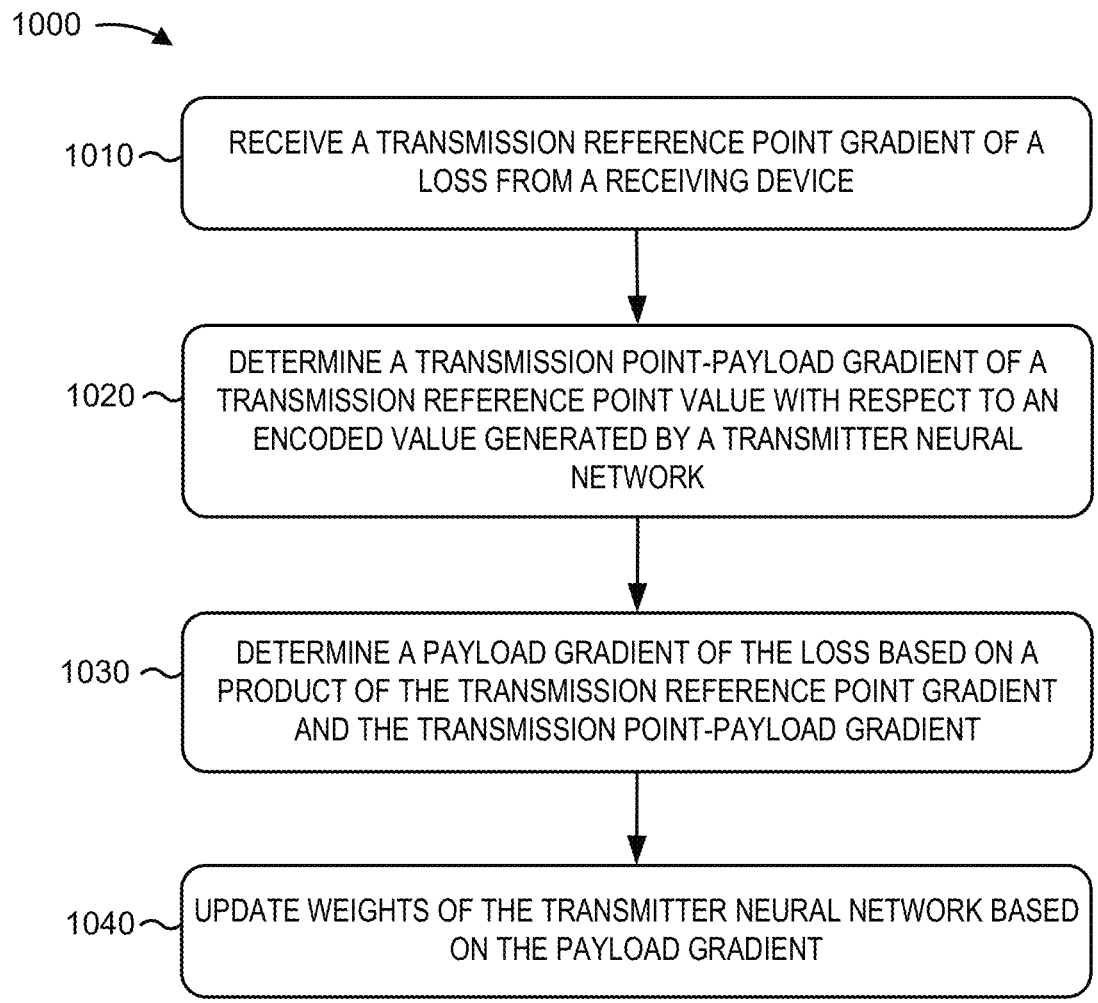
FIG. 10 is a diagram illustrating an example process performed, for example, by a transmitting device, in accordance with various aspects of the present disclosure.

FIG. 10 is a diagram illustrating an example process 1000 performed, for example, by a transmitting device, in accordance with various aspects of the present disclosure. The example process 1000 is an example of gradient feedback framework for joint transceiver neural network training.

As shown in FIG. 10, in some aspects, the process 1000 may include receiving a transmission reference point gradient of a loss from a receiving device (block 1010). For example, the base station (e.g., using the antenna 234, DEMOD 232, MIMO detector 236, receive processor 238, the SOC 300, controller/processor 240, memory 242, and/or the like) can receive a transmission reference point gradient of a loss from a receiving device.

As shown in FIG. 10, in some aspects, the process 1000 may include determining a transmission point-payload gradient of a transmission reference point value with respect to an encoded value generated by a transmitter neural network (block 1020). For example, the base station (e.g., using the controller/processor 240, the SOC 300, memory 242, and/or the like) can determine a transmission point-payload gradient of a transmission reference point value.

As shown in FIG. 10, in some aspects, the process 1000 may include determining a payload gradient of the loss based on a product of the transmission reference point gradient and the transmission point-payload gradient (block 1030). For example, the base station (e.g., using the controller/processor 240, the SOC 300, memory 242, and/or the like) can determine a payload gradient of the loss.

As shown in FIG. 10, in some aspects, the process 1000 may include updating weights of the transmitter neural network based on the payload gradient (block 1040). For example, the base station (e.g., using the controller/processor 240, the SOC 300, memory 242, and/or the like) can update weights of the transmitter neural network.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a receiving device, comprising:
   determining a transmission reference point value;
   determining a transmission point-pilot point gradient of a pilot measuring point value with respect to the transmission reference point value based on a channel estimate associated with a received pilot signal;
   determining a pilot measuring point gradient of a loss with respect to the pilot measuring point value;
   determining a transmission reference point gradient of a loss based on the transmission point-pilot point gradient and the pilot measuring point gradient; and
   transmitting a message comprising the transmission reference point gradient to a transmitting device.

2. The method of claim 1, further comprising:
   training a non-linearity neural network to learn a non-linear channel response based on the received pilot signal; and
   estimating the pilot measuring point value from the non-linearity neural network.

3. The method of claim 1, further comprising determining the transmission reference point gradient based on a product of the pilot measuring point gradient and the transmission point-pilot point gradient.

4. The method of claim 1, further comprising:
   determining a reference point input-output gradient of the transmission reference point value with respect to an input to a reference point function; and
   determining the transmission reference point gradient based on a product of the pilot measuring point gradient, the transmission point-pilot point gradient, and the reference point input-output gradient.

5. The method of claim 4, in which the reference point function is known by both the receiving device and the transmitting device.

6. The method of claim 1, further comprising compressing the transmission reference point gradient.

7. The method of claim 1, further comprising:
   accumulating the transmission reference point gradient over a plurality of time steps; and
   transmitting the accumulated transmission reference point gradient.

8. An apparatus for wireless communications performed by a receiving device, comprising:
   at least one processor,
   memory coupled with the at least one processor; and
   instructions stored in the memory and operable, when executed by the at least one processor, to cause the apparatus:
   to determine a transmission reference point value;
   to determine a transmission point-pilot point gradient of a pilot measuring point value with respect to the transmission reference point value based on a channel estimate associated with a received pilot signal;
   to determine a pilot measuring point gradient of a loss with respect to the pilot measuring point value;
   to determine a transmission reference point gradient of a loss based on the transmission point-pilot point gradient and the pilot measuring point gradient; and
   to transmit a message comprising the transmission reference point gradient to a transmitting device.

9. The apparatus of claim 8, wherein execution of the instructions further cause the apparatus:
   to train a non-linearity neural network to learn a non-linear channel response based on the received pilot signal; and
   to estimate the pilot measuring point value from the non-linearity neural network.

10. The apparatus of claim 8, wherein execution of the instructions further cause the apparatus to determine the transmission reference point gradient based on a product of the pilot measuring point gradient and the transmission point-pilot point gradient.

11. The apparatus of claim 8, wherein execution of the instructions further cause the apparatus:
   to determine a reference point input-output gradient of the transmission reference point value with respect to an input to a reference point function; and
   to determine the transmission reference point gradient based on a product of the pilot measuring point gradient, the transmission point-pilot point gradient, and the reference point input-output gradient.

12. The apparatus of claim 11, in which the reference point function is known by both the receiving device and the transmitting device.

13. The apparatus of claim 8, wherein execution of the instructions further cause the apparatus to compress the transmission reference point gradient.

14. The apparatus of claim 8, wherein execution of the instructions further cause the apparatus:
   to accumulate the transmission reference point gradient over a plurality of time steps; and
   to transmit the accumulated transmission reference point gradient.

15. A receiving device for wireless communications, comprising:
   means for determining a transmission reference point value;
   means for determining a transmission point-pilot point gradient of a pilot measuring point value with respect to the transmission reference point value based on a channel estimate associated with a received pilot signal;
   means for determining a pilot measuring point gradient of a loss with respect to the pilot measuring point value;
   means for determining a transmission reference point gradient of a loss based on the transmission point-pilot point gradient and the pilot measuring point gradient; and
   means for transmitting a message comprising the transmission reference point gradient to a transmitting device.

16. The receiving device of claim 15, further comprising:
   means for training a non-linearity neural network to learn a non-linear channel response based on the received pilot signal; and
   means for estimating the pilot measuring point value from the non-linearity neural network.

17. The receiving device of claim 15, further comprising means for determining the transmission reference point gradient based on a product of the pilot measuring point gradient and the transmission point-pilot point gradient.

18. The receiving device of claim 15, further comprising:
   means for determining a reference point input-output gradient of the transmission reference point value with respect to an input to a reference point function; and
   means for determining the transmission reference point gradient based on a product of the pilot measuring point gradient, the transmission point-pilot point gradient, and the reference point input-output gradient.

19. The receiving device of claim 18, in which the reference point function is known by both the receiving device and the transmitting device.

20. The receiving device of claim 15, further comprising means for compressing the transmission reference point gradient.

21. The receiving device of claim 15, further comprising:
   means for accumulating the transmission reference point gradient over a plurality of time steps; and
   means for transmitting the accumulated transmission reference point gradient.

22. A non-transitory computer-readable medium having program code recorded thereon, the program code executed by at least one processor of a receiving device and comprising:
   program code to determine a transmission reference point value;
   program code to determine a transmission point-pilot point gradient of a pilot measuring point value with respect to the transmission reference point value based on a channel estimate associated with a received pilot signal;
   program code to determine a pilot measuring point gradient of a loss with respect to the pilot measuring point value;
   program code to determine a transmission reference point gradient of a loss based on the transmission point-pilot point gradient and the pilot measuring point gradient; and
   program code to transmit a message comprising the transmission reference point gradient to a transmitting device.

\* \* \* \* \*